United States Patent
Takei et al.

(10) Patent No.: US 12,041,216 B2
(45) Date of Patent: Jul. 16, 2024

(54) COLOR ADJUSTMENT APPARATUS AND NON-TRANSITORY COMPUTER READABLE MEDIUM

(71) Applicant: FUJIFILM Business Innovation Corp., Tokyo (JP)

(72) Inventors: Tomohiko Takei, Kanagawa (JP); Kota Terada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 3 days.

(21) Appl. No.: 18/155,072

(22) Filed: Jan. 17, 2023

(65) Prior Publication Data
US 2024/0089400 A1 Mar. 14, 2024

(30) Foreign Application Priority Data
Sep. 12, 2022 (JP) ................. 2022-144835

(51) Int. Cl.
*H04N 1/00* (2006.01)
*G01J 3/46* (2006.01)
(Continued)

(52) U.S. Cl.
CPC ............ *H04N 1/6052* (2013.01); *G01J 3/462* (2013.01); *G01J 3/506* (2013.01); *H04N 1/00395* (2013.01); *H04N 1/6094* (2013.01)

(58) Field of Classification Search
None
See application file for complete search history.

(56) References Cited

U.S. PATENT DOCUMENTS 6,522,338 B1 * 2/2003 Takagi ................. H04N 1/6058
345/600

FOREIGN PATENT DOCUMENTS

| JP | H11136504 | * | 5/1999 | ............. H04N 1/603 |
| JP | 2000308097 | * | 11/2000 | ............... G09G 1/00 |
| JP | 2010268294 | | 11/2010 | |

OTHER PUBLICATIONS

S. Abet and G. Marcu, "A neural network approach for RGB to YMCK color conversion," Proceedings of TENCON'94—1994 IEEE Region 10's 9th Annual International Conference on: 'Frontiers of Computer Technology', Singapore, 1994, pp. 6-9 vol. 1, doi: 10.1109/TENCON.1994.369345. (Year: 1994).*

* cited by examiner

*Primary Examiner* — Beniyam Menberu
(74) *Attorney, Agent, or Firm* — JCIPRNET

(57) ABSTRACT

A color adjustment apparatus includes a processor configured to: acquire desired color measurement value information about a target display by inputting a medium color measurement value of a target printing medium and spectral distribution characteristics of a specific color on the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the specific color on the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and adjust, based on the desired color measurement value information about the target display, a color profile of the target display.

7 Claims, 7 Drawing Sheets

(51) Int. Cl.
*G01J 3/50* (2006.01)
*H04N 1/60* (2006.01)

FIG. 2

| | MEDIUM COLOR MEASUREMENT VALUE {16a} | | DIFFERENCE BETWEEN DISPLAY COLOR MEASUREMENT VALUE AND MEDIUM COLOR MEASUREMENT VALUE {16b} | | SPECTRAL DISTRIBUTION CHARACTERISTICS {16c} | | |
|---|---|---|---|---|---|---|---|
| | x | y | dx | dy | PEAK WAVELENGTH 1 | HALF-VALUE WIDTH 1 | |
| 16 → | 0.350 | 0.325 | −0.035 | −0.022 | 543 | 20 | ... |
| 16 → | 0.345 | 0.340 | −0.046 | −0.033 | 678 | 84 | ... |
| 16 → | 0.320 | 0.345 | −0.017 | −0.066 | 849 | 49 | ... |
| | ... | ... | ... | ... | ... | ... | ... |

COLOR ADJUSTMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-144835 filed Sep. 12, 2022.

BACKGROUND

(i) Technical Field

The present disclosure relates to a color adjustment apparatus and a non-transitory computer readable medium.

(ii) Related Art

Adjusting a color profile of a display so that data on different displays are displayed in equivalent display colors has been performed.

For example, in Japanese Unexamined Patent Application Publication No. 2010-268294, a color management system is disclosed. In the color management system, in a first environment, a first observer adjusts a first display so that a color of a display image displayed on a first display and a color in a color chart, which is a reflective object, match. In a second environment, a second observer adjusts a second display so that a color of a display image displayed on a second display and a color in a color chart match. A transformation matrix indicating the relationship between an RGB value of the adjusted first display and an RGB value of the adjusted second display is derived, and a display color on the first display or the second display is determined on the basis of the transformation matrix.

SUMMARY

Adjusting the color profile of a display so that a color on a printing medium such as paper and a color on the display become equivalent will be considered. A method in which a user manually adjusts the color profile so that a color on the printing medium such as paper and a color on the display become equivalent may be available. However, if many types of printing media are used, the user needs to perform adjustment for each printing medium, which requires time and effort.

Thus, it is desirable that the color profile of the display be automatically adjusted so that a color on the printing medium and a color on the display become equivalent.

As a method for automatically adjusting a color profile, a color profile of a display may be adjusted so that a medium color measurement value obtained by measuring a specific color on a printing medium and a display color measurement value obtained by measuring the specific color displayed on a display match. In this method, however, there may be a case where the specific color on the printing medium and the specific color on the display do not match in appearance. In other words, in the case where the color profile of the display is adjusted so that a color on the printing medium and a color on the display become equivalent, the medium color measurement value and the display color measurement value might not match.

Such a discrepancy arises from a difference between spectral distribution characteristics obtained when color measurement is performed for the printing medium and spectral distribution characteristics obtained when color measurement is performed for the display. For example, in the case where a specific color is white, as illustrated in FIG. 7, light intensities of light emission wavelengths are substantially uniform in the spectral distribution characteristics obtained when color measurement is performed for the printing material. Meanwhile, color on the display is typically expressed by a combination of light-emitting elements that emit light in red (R), green (G), and blue (B). Thus, as illustrated in FIG. 8, light intensities of light emission wavelengths of red, green, and blue are remarkably large.

Aspects of non-limiting embodiments of the present disclosure relate to reducing the time and effort in adjusting a color profile of a display so that a color on a printing medium and a color on the display become equivalent, while a difference in appearance between a specific color on the printing medium and a specific color on the display that occurs when a medium color measurement value and a display color measurement value match being taken into consideration.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a color adjustment apparatus including a processor configured to: acquire desired color measurement value information about a target display by inputting a medium color measurement value of a target printing medium and spectral distribution characteristics of a specific color on the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the specific color on the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and adjust, based on the desired color measurement value information about the target display, a color profile of the target display.

BRIEF DESCRIPTION OF THE DRAWINGS

Exemplary embodiments of the present disclosure will be described in detail based on the following figures, wherein:

FIG. 2 is a diagram illustrating an example of learning data;

DETAILED DESCRIPTION

Figure 1:
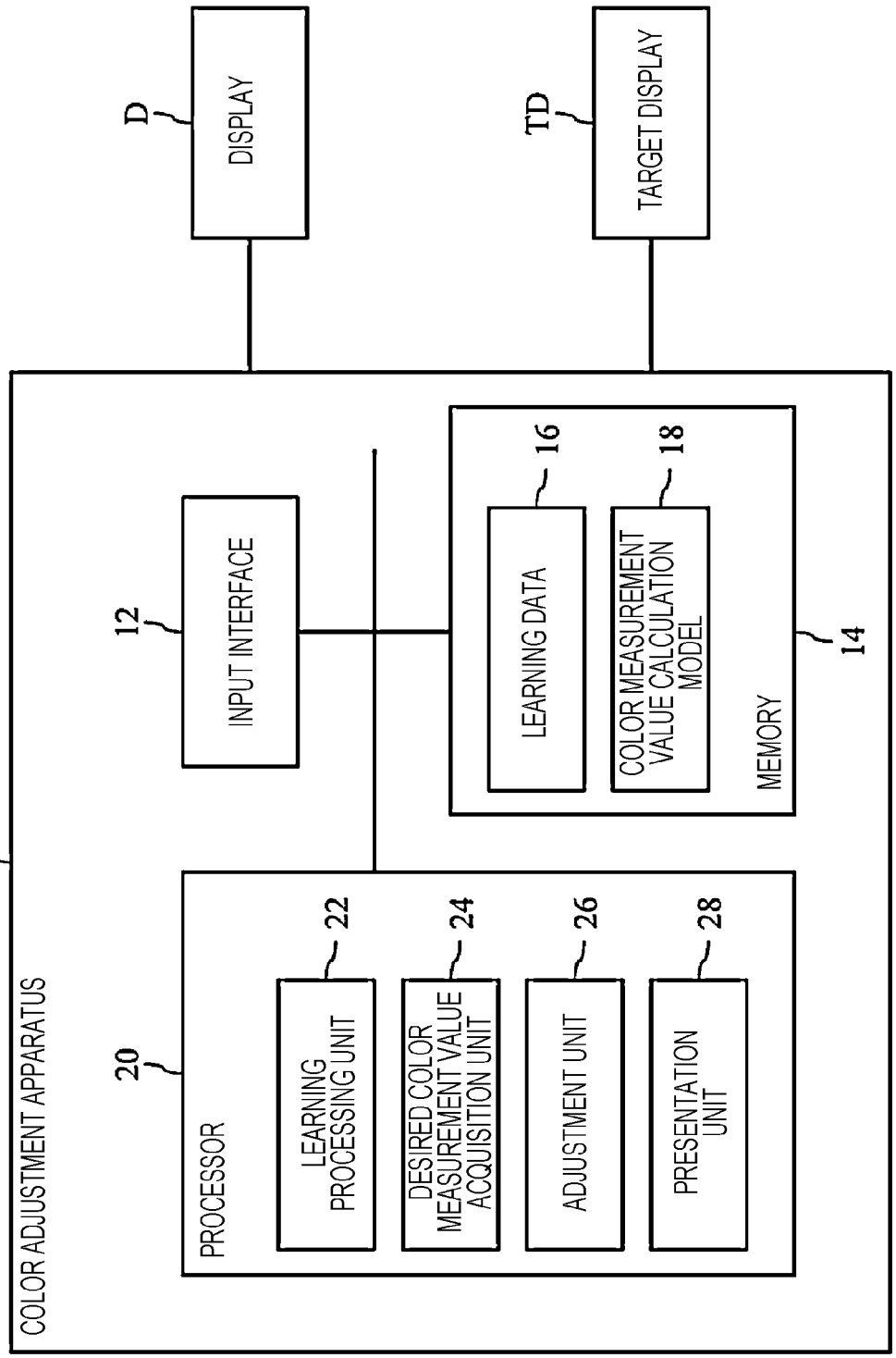
FIG. 1 is a schematic diagram of a configuration of a color adjustment apparatus according to an exemplary embodiment.

FIG. 1 is a schematic diagram of a configuration of a color adjustment apparatus 10 according to an exemplary embodiment. The color adjustment apparatus 10 is an apparatus that includes a graphic board for displaying a screen on a display D or a target display TD. Typically, the color adjustment apparatus 10 is a personal computer. However, the color adjustment apparatus 10 may be any apparatus as long as it is capable of displaying a screen on the display D or the target display TD and capable of adjusting the color profile of the display D or the target display TD. The display D and the target display TD are, for example, liquid crystal panels, organic electroluminescence (EL) displays, or the like. The display D is a display that is used to acquire learning data 16, which will be described later. The target display TD is a display for which the color profile is to be adjusted on a basis of a color measurement value calculation model 18, which will be described later.

An input interface 12 includes, for example, a mouse, a keyboard, a touch panel, or the like. The input interface 12 is used by a user to input various instructions to the color adjustment apparatus 10.

A memory 14 includes, for example, a hard disk drive (HDD), a solid state drive (SSD), a read only memory (ROM), a random access memory (RAM), or the like. The memory 14 may be provided separately from a processor 20, which will be described later, or at least part of the memory 14 may be provided inside the processor 20. A color adjustment program for causing units of the color adjustment apparatus 10 to operate is stored in the memory 14. The color adjustment program may be stored in a non-transitory computer-readable recording medium such as a universal serial bus (USB) memory or a compact disc-read only memory (CD-ROM). The color adjustment apparatus 10 is capable of reading the color adjustment program from the above-mentioned recording medium and executing the color adjustment program. Furthermore, as illustrated in FIG. 1, the learning data 16 and the color measurement value calculation model 18 are stored in the memory 14.

The learning data 16 is data used to train the color measurement value calculation model 18. The learning data 16 is acquired by a learning data acquisition person and is stored into the memory 14. FIG. 2 is a diagram illustrating an example of the learning data 16. The learning data 16 includes a combination of a medium color measurement value 16a obtained by measuring a specific color on a printing medium such as paper, display color measurement value information 16b indicating a display color measurement value obtained by measuring the specific color on the display D that has been adjusted to be displayed in a color equivalent to the specific color on the printing medium, and spectral distribution characteristics 16c of the specific color on the display D before the adjustment is made. A method for acquiring the learning data 16 will be described below.

First, a method for acquiring the medium color measurement value 16a will be described. The medium color measurement value 16a is acquired when a specific color on a printing medium is measured by a learning data acquisition person using a colorimeter. For easier color measurement, for example, it is desirable that a specific color on a printing medium be the color of the printing medium itself, that is, the color of the background where no printing has been done. However, the specific color is not necessarily the color of the printing medium itself.

Furthermore, it is desirable that the specific color be white. However, the specific color is not necessarily white. As described above or as described in detail later, the display color measurement value information 16b included in the learning data 16 represents a display color measurement value obtained when adjustment is performed in such a manner that the specific color on the printing medium and the specific color on the display D are the same in appearance. That is, the display color measurement value information 16b is obtained by measuring the specific color on the display D that has been adjusted based on the specific color. Human beings have a tendency to recognize a color with reference to white, and how the color of white looks to a person may affect how other colors look to the person. Thus, it is desirable that white, which affects how human beings recognize color, be used as a specific color.

Figure 3:
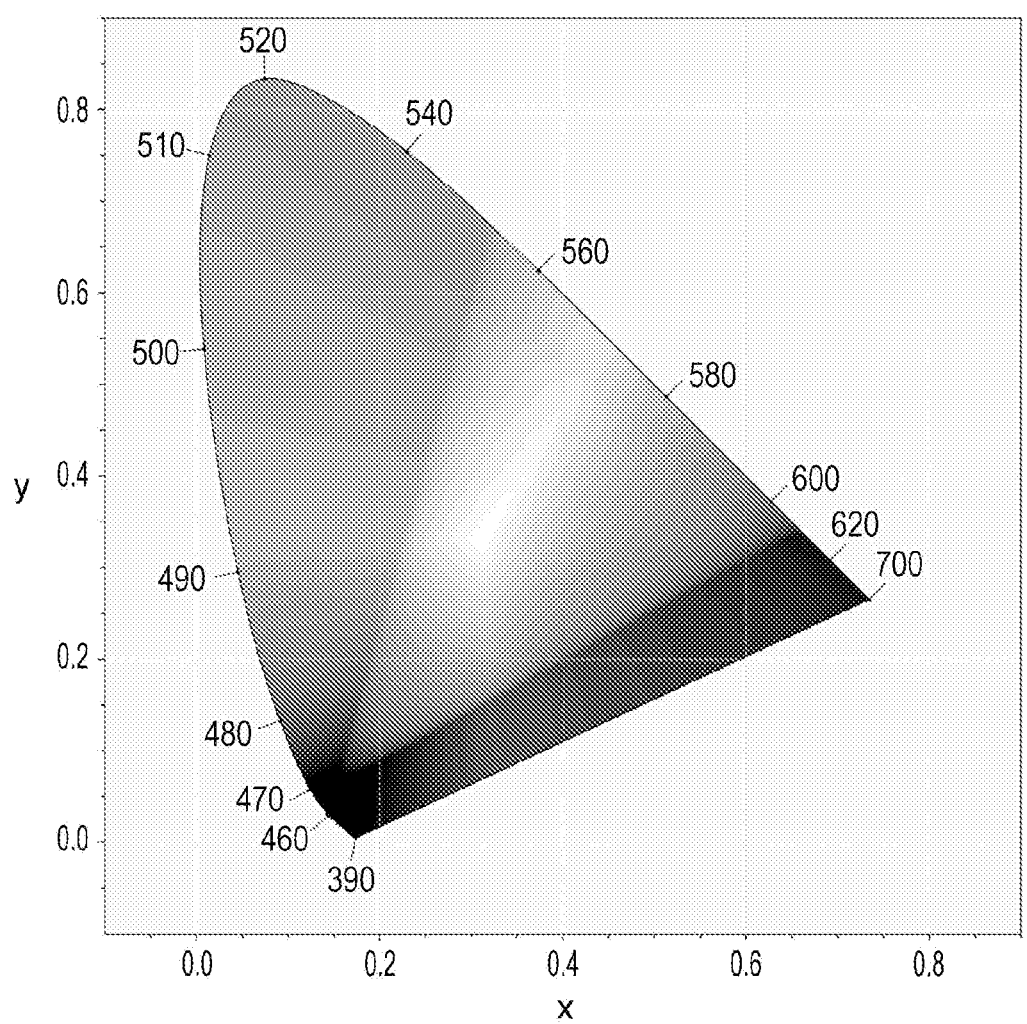
FIG. 3 is a diagram illustrating an xy chromaticity diagram.

In this exemplary embodiment, a color measurement value is represented by a CIE 1931 XYZ color space. More specifically, a color measurement value is represented by xy coordinates of an xy chromaticity diagram illustrated in FIG. 3. Obviously, color measurement values are not necessarily represented by the method mentioned above.

Next, a method for acquiring the display color measurement value information 16b will be described. First, the learning data acquisition person acquires image data by optically reading, using a scanner, the printing medium for which color measurement is performed for the medium color measurement value 16a or by photographing the printing medium, and causes the acquired image data to be displayed on the display D. Then, the learning data acquisition person adjusts the color profile of the display D so that the specific color on the display D becomes equivalent to the specific color on the printing medium. For example, the learning data acquisition person is able to adjust the color profile of the display D by causing the xy chromaticity diagram illustrated in FIG. 3 as well as the image data to be displayed on the display D and specifying the specific color on the xy chromaticity diagram.

Figure 4:
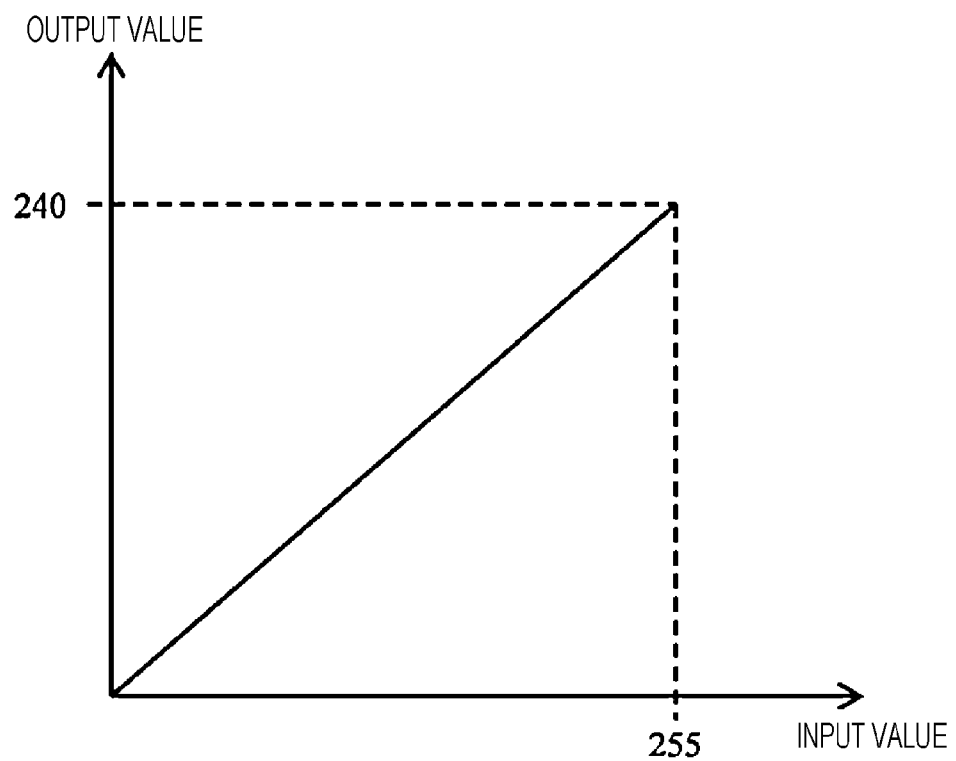
FIG. 4 is a diagram illustrating an example of a gradation correction curve.

A color profile includes, for example, a gradation correction curve illustrated in FIG. 4 for each of red (R), green (G), and blue (B). A gradation correction curve is a curve (or a straight line) representing the relationship between input values, which are individual pixel values (RGB values) of image data, and output values, which are pixel values (RGB values) corresponding to the input values at the time when the image data is displayed on the display D. When the color profile is adjusted, color tones of identical image data items on the display D are made to differ from each other.

After adjusting the color profile, the learning data acquisition person measures, using the colorimeter, the specific color on the display D (in other words, displayed on the display D) to acquire a display color measurement value. The display color measurement value information 16b may be the display color measurement value acquired as described above. However, in this exemplary embodiment, the learning data acquisition person calculates a difference between the display color measurement value and the medium color measurement value 16a and uses the calculated difference as the display color measurement value information 16b. In this exemplary embodiment, the difference between the display color measurement value and the medium color measurement value 16a is represented by a difference between an x value of the display color measurement value and an x value of the medium color measurement value 16a and a difference between a y value of the display color measurement value and a y value of the medium color measurement value 16a.

Finally, a method for acquiring the spectral distribution characteristics 16c will be described. The spectral distribution characteristics 16c are spectral distribution characteristics of the specific color on the display D before the adjustment of the color profile described above is performed. That is, after causing the image data corresponding to the printing medium for which color measurement is performed for the medium color measurement value 16a to be displayed on the display D, the learning data acquisition person measures the specific color on the display D before the color profile of the display D is adjusted. Thus, the learning data acquisition person acquires the spectral distribution characteristics 16c.

Figure 8:
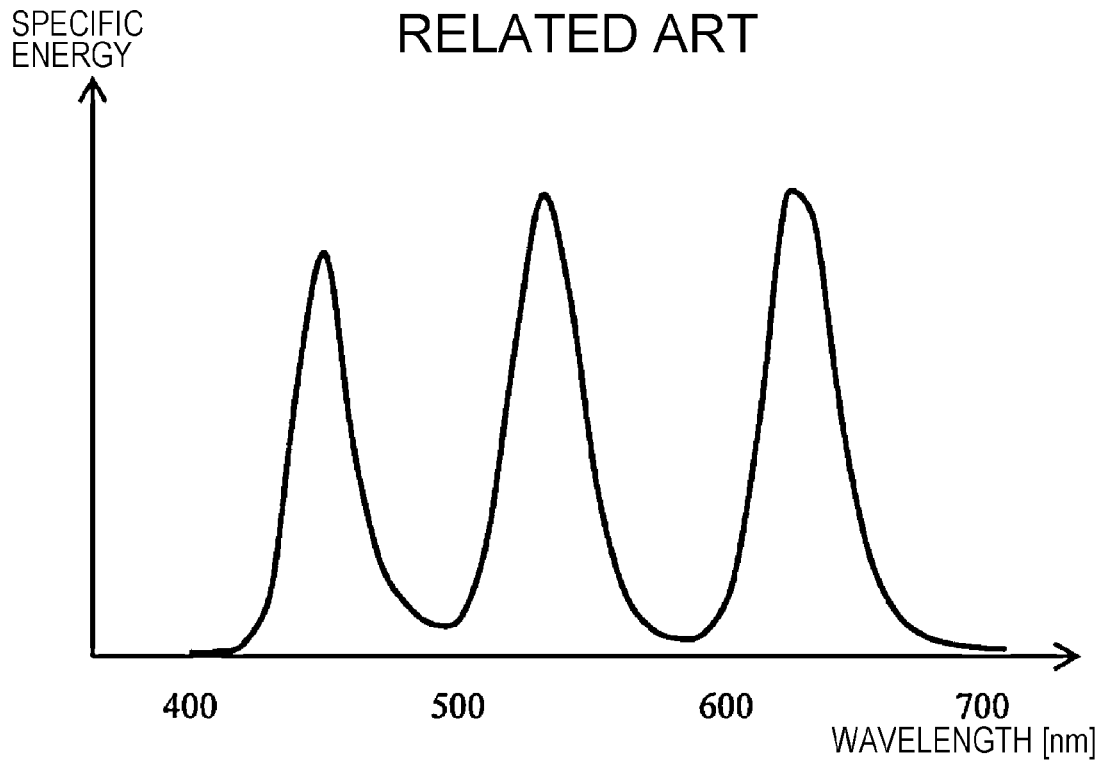
FIG. 8 is a diagram illustrating an example of a spectral distribution characteristics obtained when color measurement is performed for a display.

The spectral distribution characteristics 16c may be represented by a graph, for example, as illustrated in FIG. 8. However, only numeric values are able to be input to a learning model, and the spectral distribution characteristics 16c are thus represented by parameter columns. Specifically, the spectral distribution characteristics 16c include wavelengths of peaks of the intensity of light (specific energy) (in the case where a specific color is while, there are three peaks), half-value widths of the peaks, and the like.

The learning data acquisition person stores the medium color measurement value 16a, the display color measurement value information 16b, and the spectral distribution characteristics 16c acquired as described above into the memory 14 in association with one another as the learning data 16.

The learning data acquisition person acquires a plurality of pieces of learning data 16 and stores the acquired plurality of pieces of learning data 16 into the memory 14. Specifically, the learning data acquisition person acquires learning data 16 for a plurality of types of printing media. A specific color (in this exemplary embodiment, white) differs among the plurality of types of printing media. For example, the learning data acquisition person acquires learning data 16 for a plurality of printing media that are a plurality of pieces of white paper, the whiteness of the plurality of pieces of white paper slightly differing from one another.

Figure 5:
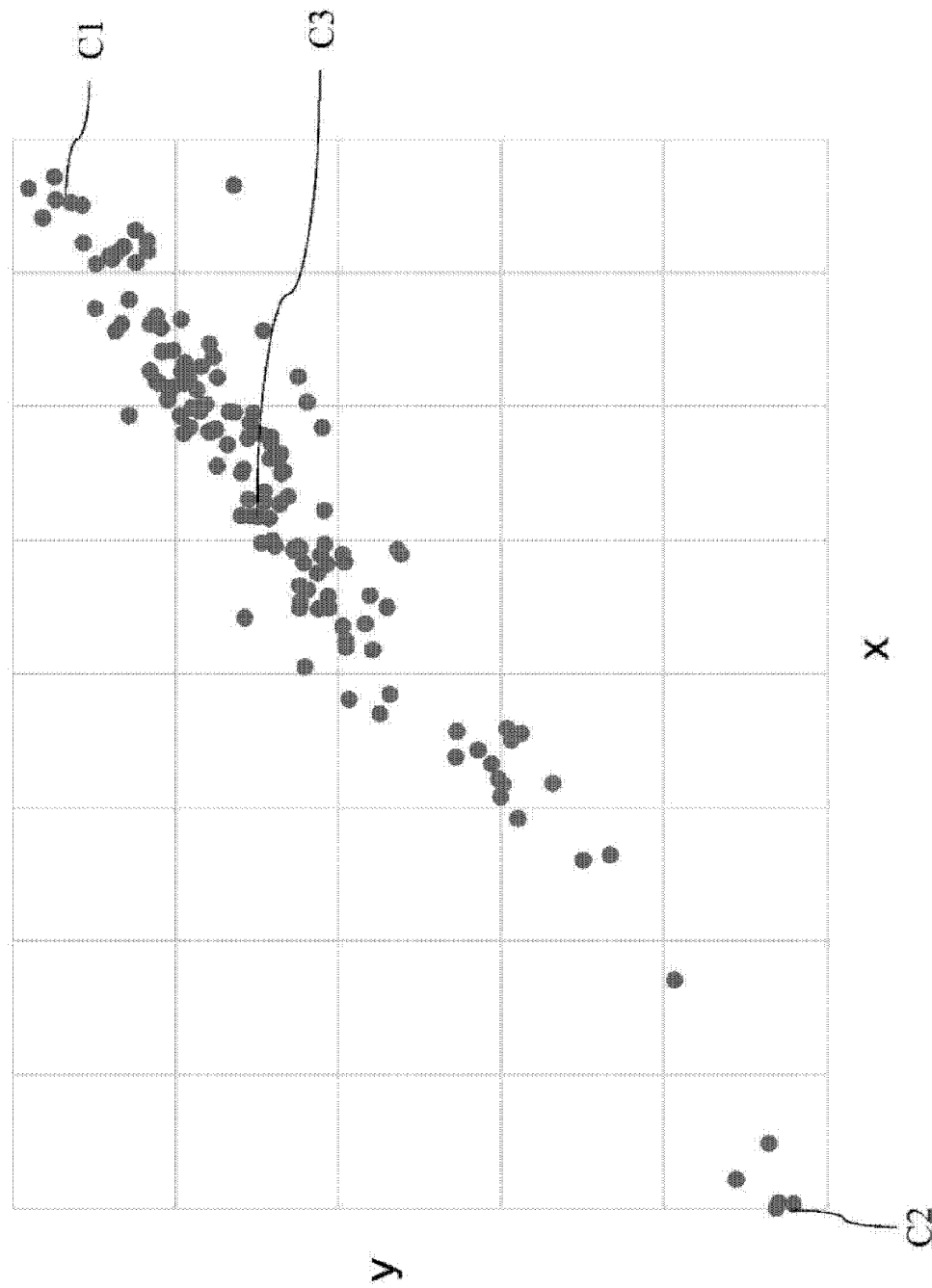
FIG. 5 is a diagram illustrating a distribution of medium color measurement values.

At least three pieces of learning data 16 are used. FIG. 5 is a diagram illustrating the distribution of medium color measurement values 16a for a plurality of printing media. As the learning data 16, at least three pieces of learning data 16 for three printing media corresponding to media color measurement values C1 and C2 that are indicated in the vicinity of both ends of the distribution of the medium color measurement values 16a and a medium color measurement value C3 that is indicated in the vicinity of the center of the distribution may be acquired. Thus, with as small as possible number of pieces of learning data 16, the color measurement value calculation model 18 is able to achieve a certain accuracy.

Referring back to FIG. 1, the color measurement value calculation model 18 is, for example, a model based on a polynomial approximation or a maximum likelihood or a learning model including a neural network or the like. The color measurement value calculation model 18 is trained by learning with teacher on the basis of the learning data 16. The details of a learning process for the color measurement value calculation model 18 will be described later, together with a process of the processor 20 (in particular, a learning processing unit 22).

As illustrated in FIG. 1, based on the color adjustment program stored in the memory 14, the processor 20 exhibits functions as the learning processing unit 22, a desired color measurement value acquisition unit 24, an adjustment unit 26, and a presentation unit 28.

The learning processing unit 22 causes the color measurement value calculation model 18 to learn on the learning data 16. The learning data 16 includes the medium color measurement value 16a, the display color measurement value information 16b, and the spectral distribution characteristics 16c. As described above, a color measurement value of a specific color on a printing medium (medium color measurement value 16a) and a color measurement value of a specific color on the display D (display color measurement value) that has been adjusted to be the same color in appearance as the specific color on the printing medium are different from each other. This difference is derived from the spectral distribution characteristics 16c of the display D. It may be said that the learning data 16 represents the relationship among the medium color measurement value 16a, the display color measurement value of the display D that has been adjusted so that the same color in appearance as the specific color on the printing medium is attained, and the spectral distribution characteristics 16c of the display D.

Thus, by learning on the learning data 16, the color measurement value calculation model 18 is able to predict the relationship among the medium color measurement value 16a, the display color measurement value of the display D that has been adjusted so that the same color in appearance as the specific color on the printing medium is attained, and the spectral distribution characteristics 16c of the display D. In this exemplary embodiment, the learning processing unit 22 trains the color measurement value calculation model 18 in such a manner that the medium color measurement value 16a and the spectral distribution characteristics 16c of the specific color on the display D are input and the desired color measurement value information indicating the display color measurement value obtained when the specific color on the display D is displayed in a color equivalent to the specific color on the printing medium is output.

For example, the color measurement value calculation model 18 is represented by a linear regression model expressed by Equation 1 and Equation 2:

$$dx = a\_x * A + b\_x * B + \ldots + c\_x * x + d\_x \quad \text{(Equation 1)}$$

$$dy = a\_y * A + b\_y * B + \ldots + c\_y * y + d\_y \quad \text{(Equation 2)}$$

Here, dx in Equation 1 and dy in Equation each represents, as a desired color measurement value information, which is output from the color measurement value calculation model 18, a difference between the medium color measurement value 16a and a desired display color measurement value (that is, a display color measurement value in the case where a specific color on the printing medium and a specific color on the display are the same in appearance).

Desired color measurement value information, which is output from the color measurement value calculation model 18, may be a desired display color measurement value itself.

Furthermore, A, B, and so on in Equation 1 and Equation 2 represent values in corresponding items of the spectral distribution characteristics 16c to be input to the color measurement value calculation model 18. Here, x in Equation 1 represents an x value of the medium color measurement value 16a input to the color measurement value calculation model 18, and y in Equation 2 represents a y value of the medium color measurement value 16a input to the color measurement value calculation model 18.

Furthermore, $a\_x$, $b\_x$, and $c\_x$ in Equation 1 and Equation 2 represent correction coefficients (in other words, weights) of corresponding parameters input to the color measurement value calculation model 18, and $d\_x$ in Equation 1 and $d\_y$ in Equation 2 represent adjustment terms (in other words, biases).

In the learning process, when the medium color measurement value 16a (x in Equation 1 and y in Equation 2) and the spectral distribution characteristics (A, B, and so on in Equation 1 and Equation 2) are input, the color measurement value calculation model 18 calculates the desired color measurement value information (dx in Equation 1 and dy in Equation 2) on the basis of current values of the correction coefficients $a\_x$, $b\_x$, and $c\_x$ and the adjustment terms dx and dy. Then, the learning processing unit 22 adjusts the correction coefficients $a\_x$, $b\_x$, and $c\_x$ and the adjustment terms $d\_x$ and dy in such a manner that a difference between the output of the color measurement value calculation model 18 and the display color measurement value information 16b of the learning data 16 becomes small. By repeating the learning process as described above, the color measurement value calculation model 18 is able to output desired color measurement value information with high accuracy on the basis of the medium color measurement value 16a and the spectral distribution characteristics 16c.

As repeatedly mentioned, the color measurement value calculation model 18 is not necessarily the linear regression model represented by Equation 1 and Equation 2 and may be a model based on a polynomial approximation or a maximum likelihood, a neural network, or the like.

The desired color measurement value acquisition unit 24 acquires, based on the color measurement value calculation model 18 that has been trained, desired color measurement value information about the target display TD. First, a user who is going to cause a specific color of a target printing medium and a specific color of the target display TD to match measures the specific color of the target printing medium to acquire a medium color measurement value of the target printing medium. Furthermore, the user causes image data corresponding to the target printing medium to be displayed on the target display TD and acquires spectral distribution characteristics of the specific color on the target display TD. The user inputs the acquired medium color measurement value of the target printing medium and the acquired spectral distribution characteristics of the specific color on the target display TD to the color adjustment apparatus 10.

The desired color measurement value acquisition unit 24 inputs the medium color measurement value of the target printing medium and the spectral distribution characteristics of the specific color on the target display TD, which have been received from the user, to the trained color measurement value calculation model 18. Thus, the color measurement value calculation model 18 outputs desired color measurement value information about the target display TD, which indicates the display color measurement value obtained when the specific color on the target display TD is displayed in a color equivalent to the specific color on the target printing medium. In this exemplary embodiment, a difference between the input medium color measurement value of the target printing medium and the desired display color measurement value is output. Thus, the desired color measurement value acquisition unit 24 is able to acquire the desired color measurement value information about the target display TD.

The adjustment unit 26 adjusts the color profile of the target display TD on the basis of the desired color measurement value information about the target display TD, which has been acquired by the desired color measurement value acquisition unit 24. Specifically, the adjustment unit 26 automatically adjusts the color profile of the target display TD in such a manner that the color measurement value obtained by measuring the specific color on the target display TD matches the display color measurement value indicated by the desired color measurement value information. Thus, the specific color on the target printing medium and the specific color on the target display TD are made to be equivalent to each other.

The presentation unit 28 presents to the user the desired color measurement value information about the target display TD, which has been acquired by the desired color measurement value acquisition unit 24. For example, the presentation unit 28 causes the desired color measurement value information to be displayed on the target display TD. The user is able to manually adjust the color profile of the target display TD on the basis of the provided desired color measurement value information. Thus, the specific color on the target printing medium and the specific color on the target display TD are made to be equivalent to each other.

According to this exemplary embodiment, once the color measurement value calculation model 18 is trained, the user is able to, only by acquiring the medium color measurement value, which has been obtained by measuring the specific color on the target printing medium, and the spectral distribution characteristics of the specific color on the target display TD, acquire the desired color measurement value information about the target display TD for making the specific color on the target printing medium and the specific color on the target display TD equivalent to each other. Thus, compared to the case where the color profile of the target display TD needs to be adjusted the same number of times as the number of types of target printing media without the desired color measurement value information about the target display TD being known, it is only necessary to adjust the color profile of the display D at least the same number of times as the number of pieces of learning data 16 in this exemplary embodiment. Accordingly, the time and effort in adjusting the color profile of the target display TD may be reduced.

Figure 6:
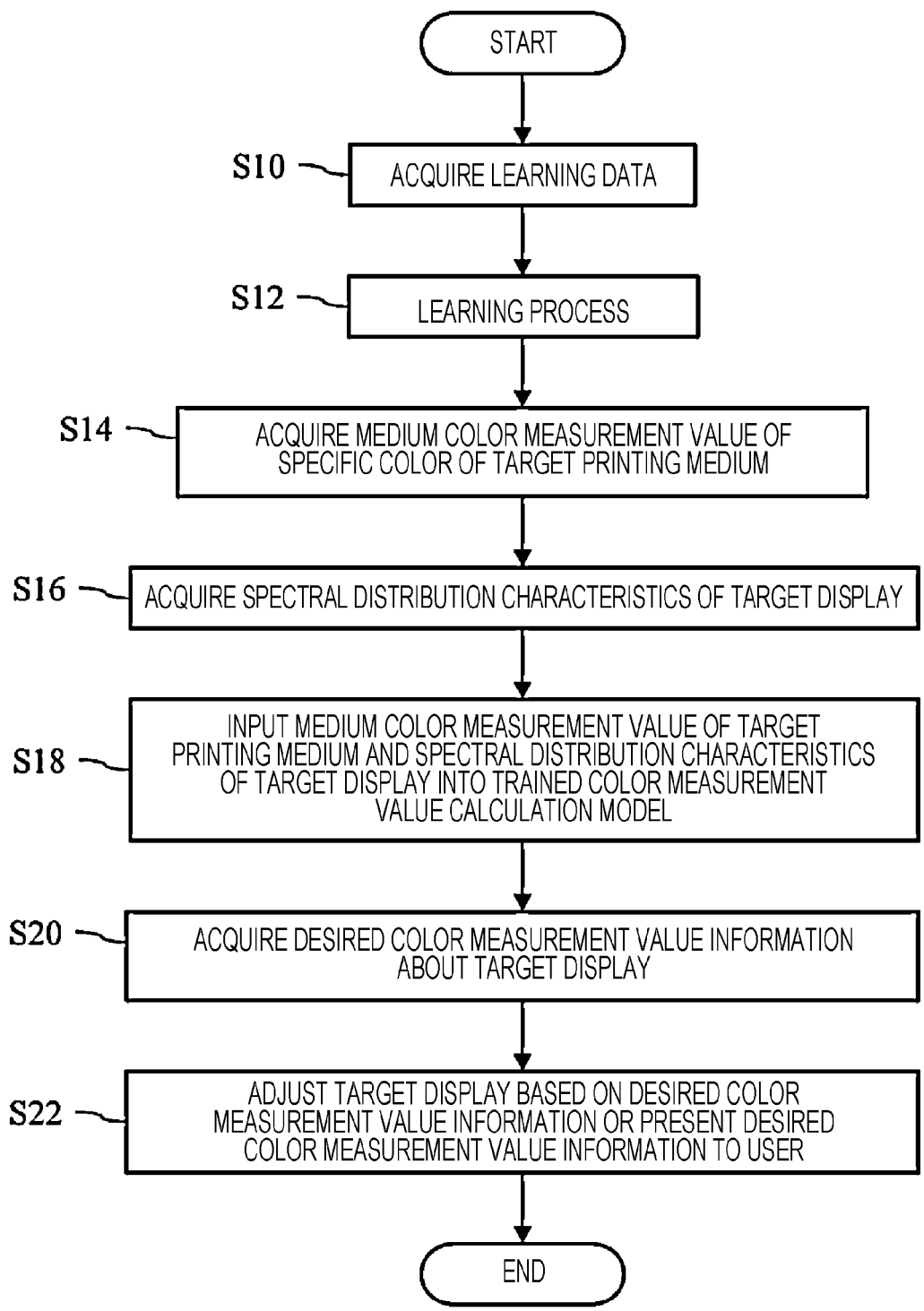
FIG. 6 is a flowchart illustrating a process for acquiring desired color measurement value information.
Figure 7:
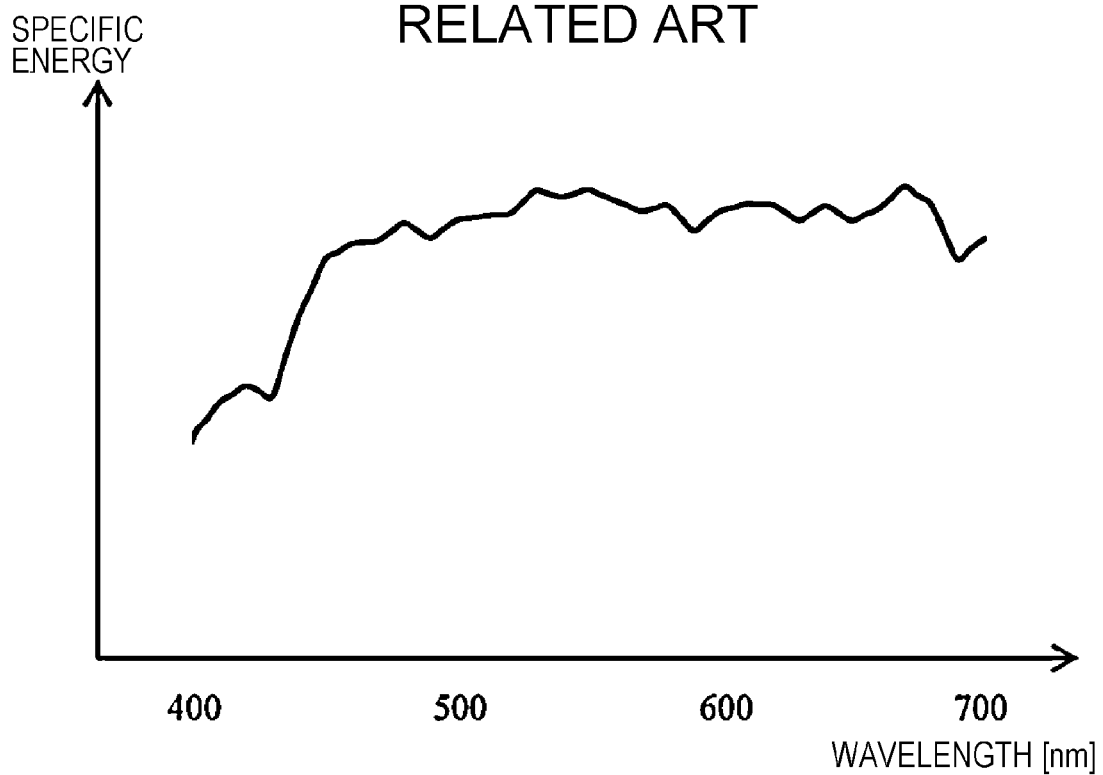
FIG. 7 is a diagram illustrating an example of spectral distribution characteristics obtained when color measurement is performed a printing medium.

The overview of the color adjustment apparatus 10 according to this exemplary embodiment is as described above. A process of the color adjustment apparatus 10 will be described below with reference to a flowchart illustrated in FIG. 6.

In step S10, the learning processing unit 22 receives the learning data 16 from a learning data acquisition person.

In step S12, the learning processing unit 22 trains the color measurement value calculation model 18 on the learning data 16 received in step S10. The learning steps in steps S10 and S12 and desired color measurement value information acquisition steps in steps S14 to S22, which will be described later, are not necessarily performed consecutively.

In step S14, the desired color measurement value acquisition unit 24 receives from the user a medium color measurement value of a target printing medium that has been obtained by measuring a specific color of the target printing medium.

In step S16, the desired color measurement value acquisition unit 24 receives from the user spectral distribution characteristics of the target display TD that has been obtained by measuring the specific color displayed on the target display TD.

In step S18, the desired color measurement value acquisition unit 24 inputs the medium color measurement value of the target printing medium acquired in step S14 and the spectral distribution characteristics of the target display TD acquired in step S16 to the color measurement value calculation model 18 that has been trained in step S12.

In step S20, the trained color measurement value calculation model 18 outputs desired color measurement value information about the target display TD. Thus, the desired color measurement value acquisition unit 24 acquires the desired color measurement value information about the target display TD.

In step S22, the adjustment unit 26 adjusts the color profile of the target display TD on the basis of the desired color measurement value information acquired in step S20. Alternatively, in step S22, the presentation unit 28 provides the desired color measurement value information acquired in step S20 to the user. The user is able to manually adjust the target display TD on the basis of the presented desired color measurement value information.

The present disclosure is not limited to the exemplary embodiment described above and various changes may be made without departing from the spirit of the present disclosure.

For example, although the learning process for training the color measurement value calculation model 18 is performed by the processor 20 (in particular, the learning processing unit 22) of the color adjustment apparatus 10 in the exemplary embodiment described above, the learning process for the color measurement value calculation model 18 is not necessarily performed by the color adjustment apparatus 10 and may be performed by other apparatuses. In this case, the color measurement value calculation model 18 that has been trained may be stored in the memory 14, and the processor 20 does not need to exhibit a function as the learning processing unit 22.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
A color adjustment apparatus comprising:
a processor configured to:
acquire desired color measurement value information about a target display by inputting a medium color measurement value of a target printing medium and spectral distribution characteristics of a specific color on the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the specific color on the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and
adjust, based on the desired color measurement value information about the target display, a color profile of the target display.

(((2)))
A color adjustment apparatus comprising:
a processor configured to:
acquire desired color measurement value information about a target display by inputting a medium color measurement value of a target printing medium and spectral distribution characteristics of a specific color on the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the specific color on the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and
provide the desired color measurement value information about the target display to a user.

(((3)))
The color adjustment apparatus according to claim (((1))) or (((2))), wherein the processor is configured to perform a learning process for training the color measurement value calculation model.

(((4)))
The color adjustment apparatus according to any one of claims (((1))) to (((3))), wherein the specific color is white.

(((5)))

A color adjustment program for causing a computer to execute a process comprising:

acquiring desired color measurement value information about a target display by inputting a medium color measurement value of a target printing medium and spectral distribution characteristics of the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and adjusting, based on the desired color measurement value information about the target display, a color profile of the target display.

(((6)))

A color adjustment program for causing a computer to execute a process comprising:

acquiring desired color measurement value information about a target display by inputting a medium color measurement value of a target printing medium and spectral distribution characteristics of the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and providing the desired color measurement value information about the target display to a user.

What is claimed is:

1. A color adjustment apparatus comprising:
a processor configured to:
acquire desired color measurement value information about a target display by inputting a medium color measurement value of a target printing medium and spectral distribution characteristics of a specific color on the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the specific color on the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and
adjust, based on the desired color measurement value information about the target display, a color profile of the target display.

2. The color adjustment apparatus according to claim 1, wherein the processor is configured to perform a learning process for training the color measurement value calculation model.

3. The color adjustment apparatus according to claim 1, wherein the specific color is white.

4. A color adjustment apparatus comprising:
a processor configured to:
acquire desired color measurement value information about a target display by inputting a medium color measurement value of a target printing medium and spectral distribution characteristics of a specific color on the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the specific color on the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and
provide the desired color measurement value information about the target display to a user.

5. The color adjustment apparatus according to claim 2, wherein the processor is configured to perform a learning process for training the color measurement value calculation model.

6. The color adjustment apparatus according to claim 2, wherein the specific color is white.

7. A non-transitory computer readable medium storing a program causing a computer to execute a process for color adjustment, the process comprising:
acquiring desired color measurement value information about a target display by inputting a medium color measurement value of a target printing medium and spectral distribution characteristics of the target display to a color measurement value calculation model that has been trained, using learning data including a combination of a medium color measurement value obtained by measuring a specific color on a printing medium, display color measurement value information indicating a display color measurement value obtained by measuring the specific color on a display that has been adjusted to be displayed as a color equivalent to the specific color on the printing medium, and spectral distribution characteristics of the display before the adjustment is performed, based on the medium color measurement value of the printing medium and the spectral distribution characteristics of the display, to output the desired color measurement value information, which indicates the display color measurement value obtained when the specific color on the display is displayed as the color equivalent to the specific color on the printing medium; and adjusting, based on the desired color measurement value information about the target display, a color profile of the target display.

* * * * *